United States Patent [19]

Ringland

[11] 3,745,599

[45] July 17, 1973

[54] METHOD AND APPARATUS FOR THE ASSEMBLY OF SCREW BLANKS AND WASHERS

[75] Inventor: Kenneth D. Ringland, Keene, N.H.

[73] Assignee: Central Screw Company, Broadview, Ill.

[22] Filed: July 28, 1971

[21] Appl. No.: 166,834

[52] U.S. Cl. .................................. 10/155 A, 10/169
[51] Int. Cl. ...................... B23p 19/08, B21k 27/00
[58] Field of Search ................. 10/155, 155 A, 156, 10/158, 169; 74/89.14; 221/262, 265

[56] References Cited
UNITED STATES PATENTS

| | | | |
|---|---|---|---|
| 901,434 | 10/1908 | Fraser | 221/262 |
| 2,271,028 | 1/1942 | Olson | 10/155 A |
| 2,333,940 | 11/1943 | Kuehlman | 10/155 A |
| 2,716,761 | 9/1955 | Nielsen | 10/155 A |
| 2,593,668 | 4/1952 | Gora | 10/158 |
| 2,914,781 | 12/1959 | Prutton | 10/155 A |
| 3,226,744 | 1/1966 | Marechal et al. | 10/155 A |
| 3,492,682 | 2/1970 | Couillais | 10/169 |
| 3,523,316 | 8/1970 | Alexander | 10/155 A |
| 3,568,229 | 3/1971 | Moore et al. | 10/155 A |

Primary Examiner—Charles W. Lanham
Assistant Examiner—E. M. Combs
Attorney—Hofgren, Wegner, Allen, Stellman & McCord

[57] ABSTRACT

A method and apparatus for the assembly of washers or other apertured members onto the shank ends of screw blanks, screws or the like wherein the washers and screw blanks are fed to an assembly station where the washers are introduced to the screw blanks with the washers oriented with the planes thereof at an angle to the shank ends of the screw blanks, the shank ends of the screw blanks being moved into the apertures in the washers to pick up the washers in a continuous motion through the assembly station. One form of transfer device for the screw blanks includes a rotatable disc-shaped dial having transverse T-shaped slots for receiving the heads of screw blanks, the dial being rotatable within a stationary sleeve which has a helical cam slot for receiving the shank ends of the screw blanks so that the helical slot cams the screw blanks transversely of the dial as the dial rotates within the sleeve.

3 Claims, 9 Drawing Figures

PATENTED JUL 17 1973 3,745,599

INVENTOR
KENNETH D. RINGLAND
BY Hofgren, Wegner, Allen, Stellman &
McCord ATTORNEYS

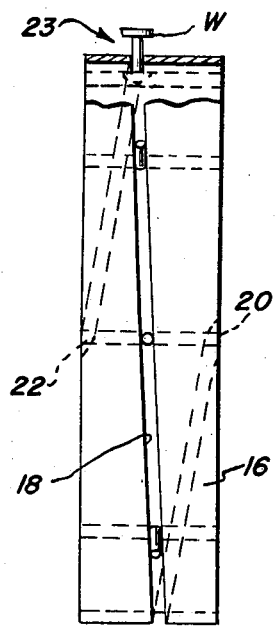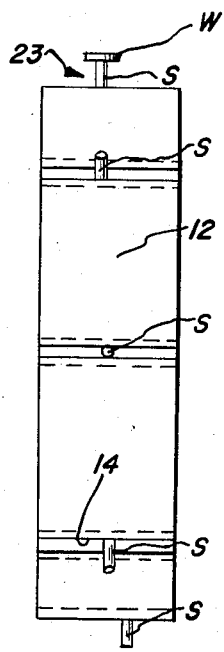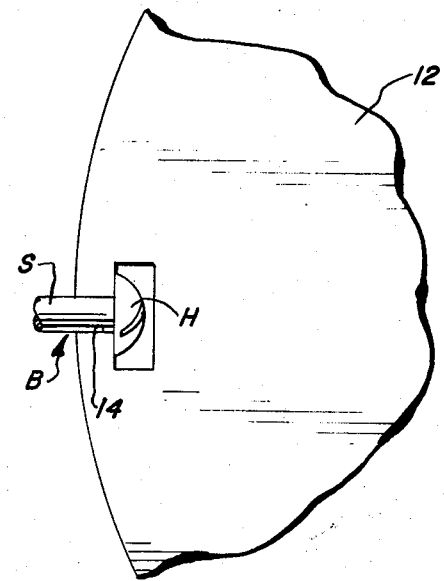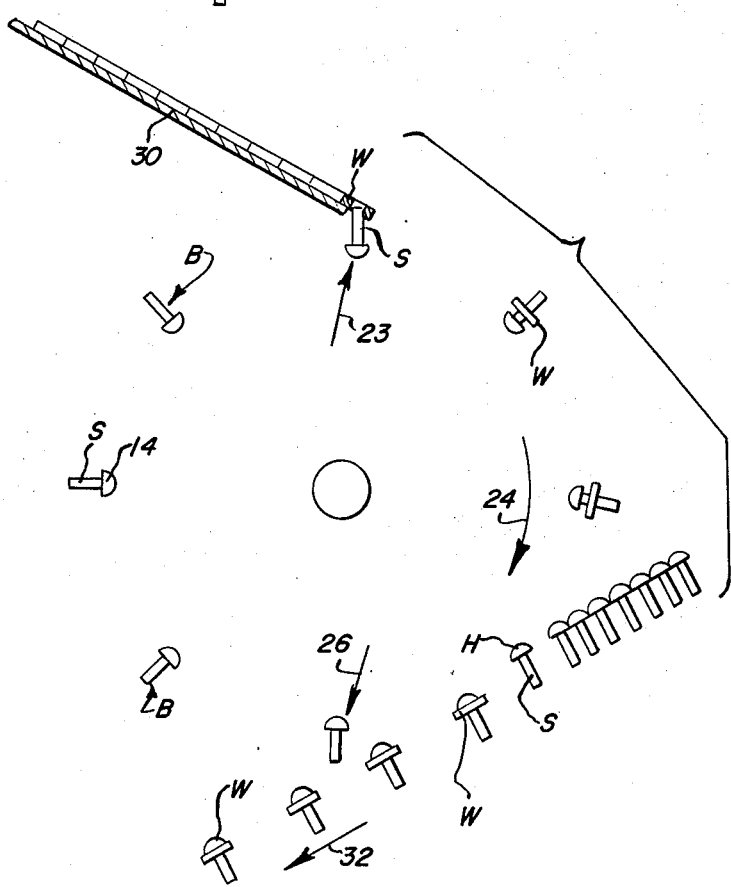

METHOD AND APPARATUS FOR THE ASSEMBLY OF SCREW BLANKS AND WASHERS

BACKGROUND AND SUMMARY OF THE INVENTION

Heretofore, the most common method for the assembly of washers onto the shank ends of screw blanks has employed the use of plunger mechanisms to either jam the screw blanks through the holes in the washers or jam the washers onto the shank ends of the screw blanks. The two principal shortcomings with such methods have been the frequent damage done to the assembly and the loss of time during assembly. Frequently, either the screw blanks or the washers are damaged or bent as a natural consequence of the force from the power plungers whenever there is any significant misalingment between the washers and the shank ends of the screw blanks. The possibility of such damage is reduced by running the equipment at a very slow speed. However, this results in a considerable loss of time in manufacture. In addition, the very nature of a reciprocating plunger or assembly head results in an inherent loss of time. More particularly, the forward stroke of the plunger is the assembly stroke, while the rearward reciprocating stroke is merely a retracting stroke, the latter being a complete loss in assembly time. This invention is directed to alleviating such problems by providing a method and apparatus for the assembly of washers or the like onto the shank ends of screw blanks or the like in a continuous assembly motion, resulting in an efficient and speedy procedure.

An object, therefore, of the present invention is to provide a new and improved method and apparatus for assembling washers or the like onto the shank ends of screw blanks or the like, with minimal damage either to the screw blanks or to the washers, in a continuous motion with no loss of time.

Another object of the invention is to provide a new and improved method and apparatus for the assembly of washers onto the shank ends of screw blanks or the like by introducing the washers at an angle to the shank ends of the screw blanks. The shank ends of the screw blanks are moved into the exposed holes in the washers whereby the screw blanks pick up the washers in a continuous motion and allow the washers to be assembled onto the shank ends of the screw blanks as the blanks and washers travel to, through and from an assembly station.

A further object of the invention is to provide a transfer device adapted particularly for use in the method described above, wherein the screw blanks are transferred through a controlled helical path. The screw blanks are picked up by the device at a first position and are transferred through the helical path with the shank ends thereof protruding outwardly to pick up the washers at a second position of the helical path and the assembled washers and blanks are discharged at a third position in the helical path. More particularly, a disc-shaped dial is provided for receiving and transferring the screw blanks, the dial being rotatable within a stationary annular sleeve. The annular outer periphery of the dial has a plurality of T-shaped slots extending transversely of the dial for slidably receiving screw blanks with the heads of the blanks in the slots and the shank ends of the blanks protruding radially outwardly from the dial. The stationary sleeve has an open ended helical cam slot for receiving the shank ends of the screw blanks which protrude outwardly from the dial whereby, as the dial is rotated within the stationary sleeve, the helical slot in the sleeve cams the screw blanks along the transverse slots in the periphery of the dial to effect movement of the screw blanks in a helical path as the dial rotates. The open ends of the helical slot in the sleeve define the pick-up and discharge stations for the blanks and the blank-washer assemblies. In other words, a screw blank enters one of the transverse slots in the periphery of the rotatable dial at one open end of the helical slot, travels in a helical path around the cam slot as the dial rotates within the sleeve, transferring the blank to a position in the helical path to pick up the washers and proceeding to the discharge position to discharge the assembled blanks and washers on the opposite side of the dial at the opposite open end of the helical slot. The assembled washers and blanks then may continue their travel down proper chutes for further operations, such as roll threading of the screw blanks, or the like.

The invention herein is not limited to the assembly of washers and screw blanks, but has other applications as hereinafter set forth.

Other objects, features and advantages of the invention will become apparent from the following detailed description taken in connection with the accompanying drawings.

DESCRIPTION OF THE DRAWINGS

FIG. 3 is an elevational view, partially cut away, of one form of apparatus of the present invention designed to perform the method of the present invention;

FIG. 4 is an elevational view of the dial portion of the apparatus shown in FIG. 3;

FIG. 5 is a fragmentary side elevational view of the dial of FIG. 4, on an enlarged scale, illustrating one of the T-shaped slots for receiving the head portions of the screw blanks;

FIG. 6 is a schematic view of a plurality of screw blanks and washers in various positions illustrating the pick up, assembly and discharge positions of the blanks and washers about the apparatus shown in FIGS. 3 and 4;

DETAILED DESCRIPTION OF THE INVENTION

The invention is contemplated herein as comprising the method of feeding washers W and screw blanks, generally designated B (having head portions H and shank portions S), to an assembly station where the washers are introduced to the screw blanks with the washers oriented at an angle to the shank ends of the screw blanks so that the screw blanks are moved into the holes H' in the washers whereby the screw blanks pick up the washers in a continuous motion through the assembly station. Preferred forms of apparatus for carrying out this method will be described in greater detail hereinafter.

Figure 2A:
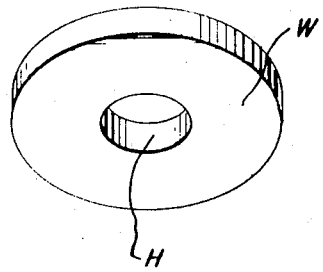
FIG. 2a is a perspective view of a washer, on an enlarged scale, to illustrate how the hole in the washer can be exposed for introduction onto the shank end of a screw blank.
Figure 2B:
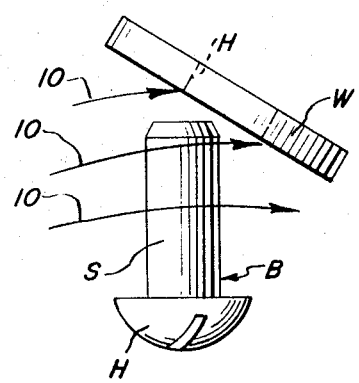
FIG. 2b is an elevational view of a washer and a screw blank, illustrating the angle of approach of a screw blank toward a canted washer, whereby the shank end of the blank may pick up the washer in a continuous motion.

Referring to FIGS. 2a and 2b, and first to FIG. 2b, it can be seen that by moving a screw blank B in a given path, for instance in the direction of arrows 10, with a washer W disposed oblique to the path of movement of the screw blank, the shank end S of the blank may be introduced to the hole H' in the washer so that the screw blank picks up the washer in a continuous motion as the blank and washer meet at an assemby station. The exposure of the hole H' in the washer, when canted relative to the direction of movement of the screw blank, is exemplified in perspective in FIG. 2a.

Figure 1:
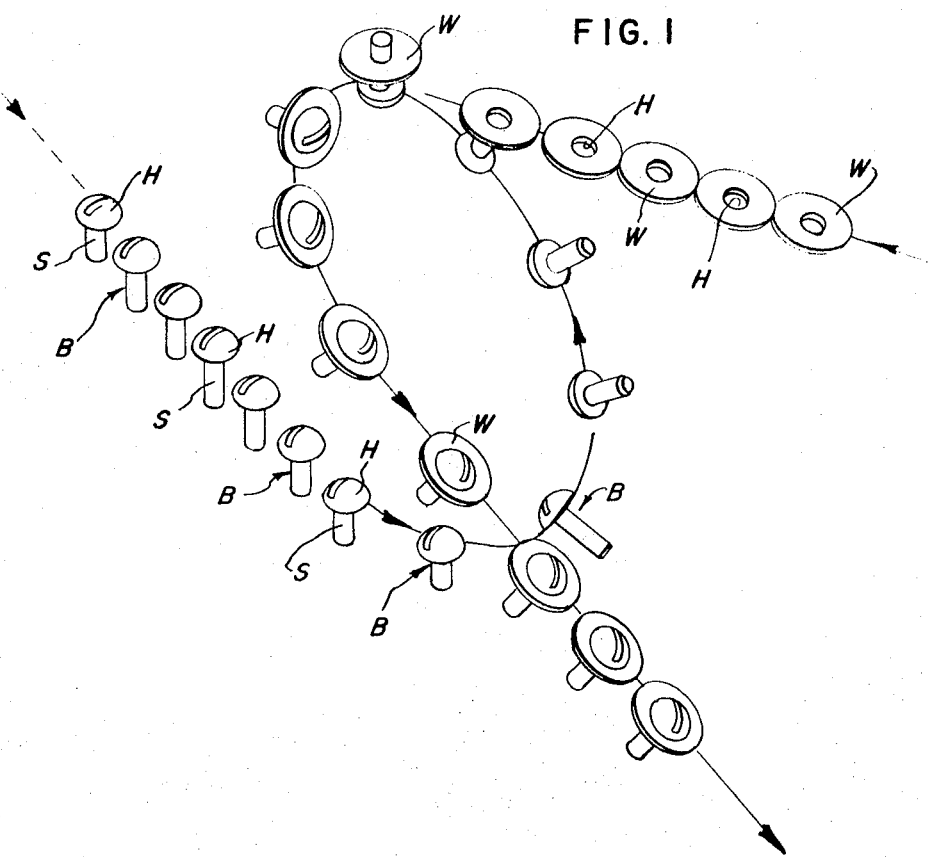
FIG. 1 is a schematic perspective view of a plurality of washers and screw blanks being fed to and through a helical assembly path as is accomplished by one embodiment of the transfer apparatus of this invention.

One type of apparatus for performing the method described above is shown in FIGS. 3, 4 and 5, with schematic views of the assembly operation performed by the apparatus shown in FIGS. 1 and 6. This apparatus transfers the screw blanks B in a controlled helical path with the shank ends S of the blanks exposed for picking up washers at a particular point along the helical path. More particularly, the apparatus includes a rotatable disc-shaped dial 12 which has a plurality of T-shaped slots 14 in the annular outer periphery of the dial. The slots 14 extend transversely of the dial, with the heads H of the screw blanks disposed in the slot, as best seen in FIG. 5. A stationary sleeve 16 is disposed about the dial 12, with the dial rotating within the sleeve. The sleeve has an open ended helical cam slot 18 for receiving the shank ends of the screw blanks which protrude radially outwardly from the dial. Thus, as the dial 12 rotates within the sleeve 16, the screw blanks which are disposed in the transverse slots 14 in the dial will be cammed transversely of the dial by the helical slot in the sleeve, the screw blanks riding along the cam slot as the dial rotates. It is readily apparent that the controlled helical path for the screw blanks is defined by the structural cooperation of the transverse slots 14 in the dial 12 and the helical cam slot 18 in the sleeve 16. Referring to FIG. 3, one open end (for instance, end 20) of the cam slot 18 in the sleeve 16 defines a pick-up station for the screw blanks so that as a transverse slot 14 in the dial 12 is aligned with the open end 20 of the helical slot, the aligned slot may pick up a screw blank at that point. The opposite end 22 of the helical cam slot 18 on the opposite side of the sleeve defines a discharge station for the screw blanks, with the washers assembled thereon. An assembly station, as at 23, may be defined intermediate the pick-up station 20 and the discharge station 22 where washers W are introduced to the continuously or intermittently moving screw blanks disposed in the dial 12, with the washers canted relative to the movement of the screw blanks so that the screw blanks pick up the washers in a continuous motion, as described above. Although the dial 12 and sleeve 16 may be disposed in any desired orientation, a vertical or semi-vertical orientation is preferred, with the assembly station for the washers generally near the top of the helical path, as at 23, and as seen in FIGS. 1 and 6. It also should be pointed out that the sleeve 16 possibly could be used as part of an in-feed chute for the screw blanks.

FIG. 6 schematically shows the operation of the transfer device shown in FIGS. 3, 4 and 5. In FIG. 6, the dial moves in the direction of arrow 24, with the stationary sleeve 16 being disposed so that the transverse slots 14 pick up the screw blanks B at a position as indicated by the arrow 26. The screw blanks are carried by the dial, and controlled by the helical cam slot 18 in the sleeve, in a helical path so as to pick up washers W at an assembly station, indicated by the arrow 23, where the washers W are fed by a chute 30 or other appropriate means at an angle to the shank ends S of the screw blanks. The assembled washers and blanks are transferred as an assembly from station 23 in the helical path, until the screw blanks are released through the discharge end 22 of the helical cam slot 18 whereby the assembly may be moved by conventional means in the direction of arrow 32 (FIG. 6) to other stations where other operations, such as roll threading, may be performed. Appropriate conventional cam means, such as additional slotted sleeves, may be employed to hold the washers W on the shank ends of the blank as the assembled washers and blanks move from the assembly station 23 to the discharge point therefor.

FIG. 1 schematically shows the movement of the screw blanks in the aforesaid helical path, and the introduction to the screw blanks of the washers W, with the washers oriented at an angle to the shank of the screw blanks, in accordance with the above-described method and apparatus.

Figure 7:
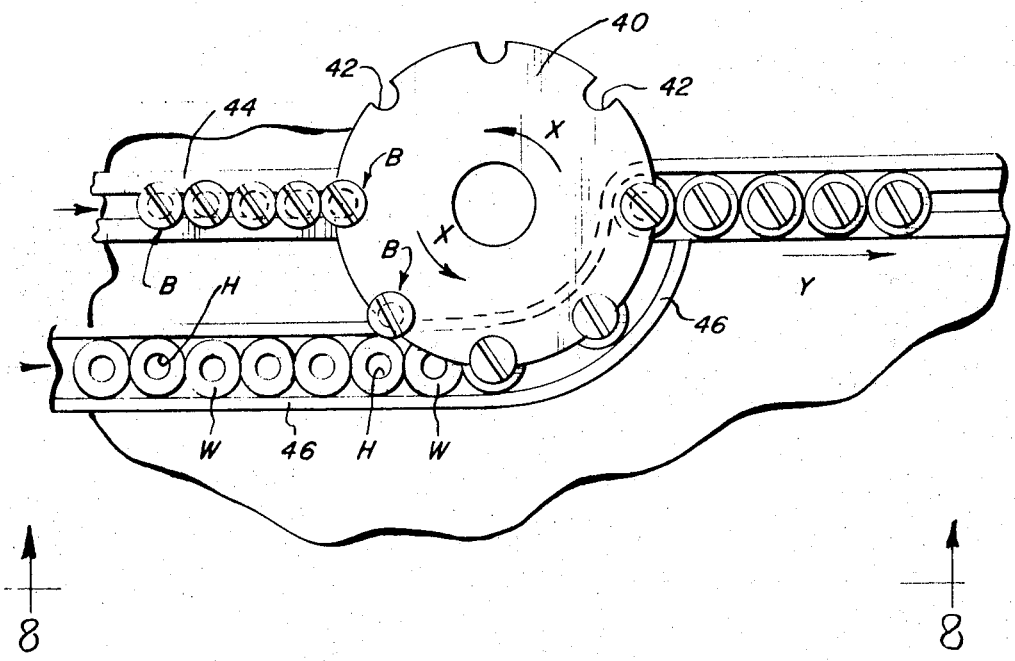
FIG. 7 is a fragmentary top plan view of another form of apparatus for assembling washers and screw blanks in accordance with the present invention.
Figure 8:
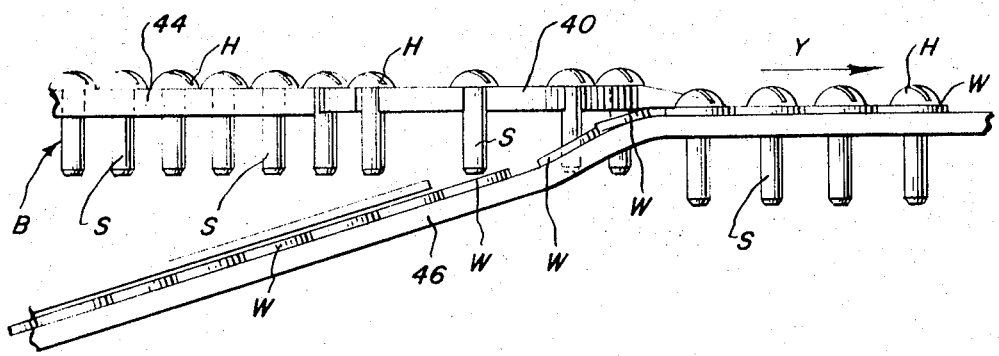
FIG. 8 is a fragmentary elevational view of the apparatus of FIG. 6, looking generally in the direction of arrows 7—7 in FIG. 6.

FIGS. 7 and 8 show another form of apparatus for carrying out the method of the present invention. This apparatus includes a generally horizontal dial 40 having a plurality of notches 42 in the periphery thereof for picking up screw blanks B which are fed to the dial by a slotted chute 44. The dial rotates in the direction of arrows X carrying the screw blanks B therewith to a point where the screw blanks pick up washers W which are fed by a chute 46 into the path of the screw blanks at an angle thereto. FIG. 8 best illustrates the "angle of attack" of the screw blanks as they approach the canted washers so that the hole in the washers are exposed and the washers are picked up by the continuous movement of the blanks and moved as an assembly away from the dial in the direction of arrow Y. Of course, like the slotted chute 44, that portion of the chute 46 at the pick-up area or station, and that portion leading away from the dial 40 in the direction of arrow Y, must also be slotted to accommodate the shank ends of the screw blanks.

It must be pointed out that the assembly method and apparatus of the present invention is not limited solely to the assembly of screw blanks and washers. For instance, finished screws may be pushed into sealing type washers. In addition, the building trade, among others, use metal washers with "gunk" or caulking compound bonded to them. The metal washers are plated prior to bonding the gunk and the screws are finished and plated. The screws are pushed into the hole in the washer and the gunk holds the two together because the hole in the gunk is smaller than the thread O.D.

The invention also contemplates the use of perferated tape for assembly purposes. Some manufacturers ship screws, nuts, washers, and other items on a tape. The items are precounted in strips so that if one was packing screws for assembly such as hinges, or the like, the packer would merely throw in a "strip" of screws. There may be requirements for special clips or washers to go along with the same strip of screws. This invention contemplates the use of perferated tape to accept the screw or, for instance, Tinnerman nuts or special clips pre-assembled on the same tape with holes in the clips matching holes in the tape to accept the screws. The tape would be fed to the screws, or vice versa, at an angle as described above in a continuous motion.

The foregoing detailed description has been given for clearness of understanding only and no unnecessary limitations should be understood therefrom as some modifications will be obvious to those skilled in the art.

I claim:

1. A transfer device for screw blanks or the like, comprising: a rotatable disc-shaped dial having an annular outer periphery, means defining a T-shaped slot in the outer periphery of the dial extending transversely of the dial for slidably receiving screw blanks with the heads of the blanks in the slot and the shank ends of the blanks protruding radially outwardly from the dial, a stationary sleeve surrounding the dial, and means defining an open ended helical cam slot in the sleeve for receiving the shank ends of the screw blanks which protrude radially outwardly from the dial so that as the dial rotates within the stationary sleeve the helical slot in the sleeve cams the screw blanks along the transverse slot in the periphery of the dial for movement of the screw blanks transversely of the dial.

2. The device of claim 1 including means for feeding washers to the shank ends of the screw blanks with the planes thereof at an angle to the shank ends of the screw blanks for assembly onto the shank ends whereby the shank ends can move into the holes in the washers to pick up the washers in a continuous motion.

3. Apparatus for assembling washers or other apertured members onto the shank ends of screw blanks or the like comprising: a rotatable disc-shaped dial having an angular outer periphery, means in the outer pheriphery of the dial extending transversely of the dial for slidably receiving screw blanks by the heads thereof so that the shank ends of the screw blanks protrude radially outwardly from the dial, means defining a generally helical cam track surrounding said dial for engaging the shank ends of the screw blanks which protrude radially outwardly from the dial as the dial rotates to cam the screw blanks transversely along the periphery of the dial for movement of the screw blanks axially of the dial; and means for feeding washers or other apertured members to the shank ends of the screw blanks with the planes thereof at an angle to the shank ends of the screw blanks for assembly onto the shank ends whereby the shank ends will move into the holes in the washers to pick up the washers in a continuous motion.

* * * * *